United States Patent [19]

Thompson

[11] 4,138,230
[45] Feb. 6, 1979

[54] DUAL PRESSURE ABSORPTION PROCESS
[75] Inventor: H. Lytle Thompson, Park Ridge, Ill.
[73] Assignee: UOP Inc., Des Plaines, Ill.
[21] Appl. No.: 813,046
[22] Filed: Jul. 5, 1977
[51] Int. Cl.$^2$ .................. B01D 53/14; B01D 53/34
[52] U.S. Cl. .................................. 55/48; 55/64; 55/70; 55/71; 55/73; 55/89; 208/213; 423/228; 423/237; 423/240; 423/242
[58] Field of Search .............. 55/48, 68, 73, 89, 64, 55/70, 71; 208/213; 423/228, 229, 242, 237, 240

[56] References Cited
U.S. PATENT DOCUMENTS

| | | | |
|---|---|---|---|
| 2,781,863 | 2/1957 | Bloch et al. | 55/73 X |
| 3,219,051 | 11/1965 | Francis | 55/48 X |
| 3,225,519 | 12/1965 | Stotler | 55/48 |
| 3,245,752 | 4/1966 | Fryar et al. | 423/229 |
| 3,563,696 | 2/1971 | Benson | 423/229 X |
| 3,607,003 | 9/1971 | Stotler | 55/73 X |
| 3,642,430 | 2/1972 | Benson | 423/228 X |
| 3,851,041 | 11/1974 | Eickmeyer | 423/229 X |
| 4,041,131 | 8/1977 | Forbes | 55/73 X |

*Primary Examiner*—Robert H. Spitzer
*Attorney, Agent, or Firm*—James R. Hoatson, Jr.; John F. Spears, Jr.; William H. Page, II

[57] ABSTRACT

An absorption process, as for the removal of H$_2$S from vapor streams, wherein a stream of lean absorbent removed from the regenerator as a sidecut is used in a high pressure absorption zone and a lean absorbent stream removed as the regenerator bottoms stream is used in a low pressure absorption zone.

9 Claims, 1 Drawing Figure

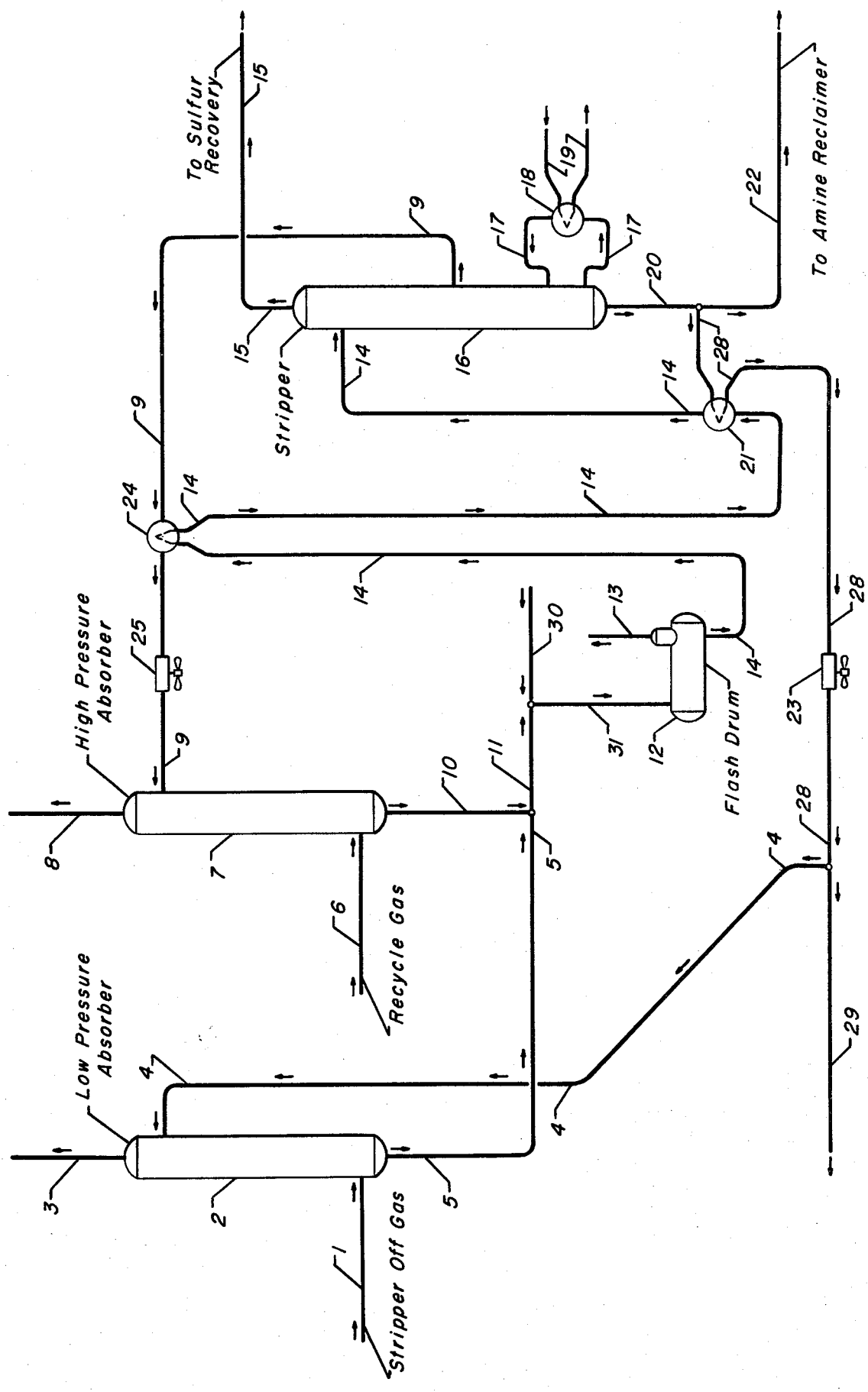

DUAL PRESSURE ABSORPTION PROCESS

FIELD OF THE INVENTION

The invention relates to a process for the separation or purification of liquid and gaseous streams containing hydrocarbons. The invention more specifically relates to the removal of acid gases such as $H_2S$ or $CO_2$ from a fluid stream through the use of a regenerable liquid absorbent which is selective for these gases. In the preferred embodiment, the invention concerns the use of an amine solution to remove $H_2S$ from a high pressure recycle gas stream and from a relatively low pressure gas stream which are produced during the refining of various petroleum fractions.

PRIOR ART

Gas purification by absorption is a commercially practiced process, and those skilled in the art are well versed in the operation of the process and are familiar with the equipment used in its performance. The process is described in many basic reference sources such as pages 14-2 to 14-39 of the 4th Edition of *The Chemical Engineers' Handbook* published by McGraw-Hill Book Co., New York, 1963. This reference specifically refers to the removal of $H_2S$ and $CO_2$ from gas streams by the use of amine solutions comprising monoethanolamine (MEA), diethanolamine (DEA) and triethanolamine (TEA). U.S. Pat. No. 3,725,252 (Cl. 208-213) presents an improved method of removing a selected constituent from a gas stream maintained under high pressure by liquid absorption. The preferred embodiment of this reference is employed to remove $H_2S$ from the high pressure recycle gas stream of a petroleum desulfurization process. The preferred absorbent is an aqueous solution of monoethanolamine. As part of the general state of the prior art, it is known to treat low pressure vapor and liquid streams by absorption in the same general manner as high pressure streams.

The regeneration of an amine absorbent solution in a stripping column is also well established in the prior art. The regeneration system is normally integrated with the absorption zone as illustrated in the article starting at page 78 of the Mar. 10, 1975 edition of *The Oil and Gas Journal*. This reference illustrates the withdrawal of a liquid sidecut from the regenerator. The reference, however, teaches the utilization of the sidecut material as the absorbent stream fed into an intermediate vertical point of an absorber. The bottoms stream of the regenerator is passed into the top of this same absorber at substantially the same pressure. The bottoms stream is thereby used to scrub the same vapor stream as the sidecut stream.

Other integrated absorption-stripping processes for purifying gas streams are described in U.S. Pat. Nos. 3,837,143 (Cl. 55-32) and 3,961,015 (Cl. 423-229).

BRIEF SUMMARY OF THE INVENTION

The invention provides a process for removing preselected chemical compounds, such as $H_2S$, from two fluid streams of different pressure. In this process a first stream of lean absorbent sufficiently stripped for use in a high pressure scrubber or absorber is withdrawn from the regenerator as a sidecut. The bottoms stream of the regenerator, which is a more thoroughly stripped solution of the absorbent, is used as the lean absorbent fed to a relatively low pressure absorber. The process thereby provides a highly energy efficient absorption process.

DESCRIPTION OF THE DRAWING

The Drawing illustrates the preferred embodiment of the invention. For the purpose of illustration it is assumed that a high pressure hydrogen-rich recycle gas stream used in a hydrodesulfurization process and a low pressure stream of stripping column off-gas are both being treated for the removal of $H_2S$. Clarity and simplicity dictate that various conventional subsystems and apparatus required for the successful operation of the process are not shown. These items include flow and pressure monitoring systems, stripper and absorber column internals, valves, pumps, etc. These items may all be of conventional design. This representation of the preferred embodiment is not intended to preclude from the scope of the inventive concept those other embodiments set out herein or which are the result of reasonable and normal modification of these embodiments.

Referring now to the Drawing, an off-gas stream which has been removed from the overhead receiver of a stripping column is passed into the bottom of a low pressure absorber 2 through transfer line 1. This feed vapor stream is countercurrently contacted with a lean amine solution which enters the absorber through line 4. This results in the transfer of substantially all the hydrogen sulfide in the off-gas stream to the amine solution and the formation of a rich amine solution which is removed from the absorber in line 5. The now purified off-gas stream is removed from the absorber via line 3. The high pressure hydrogen-rich recycle gas stream is passed into a high pressure absorber 7 through line 6. It is also countercurrently contacted with a stream of a lean amine solution. This lean amine solution has a higher $H_2S$ concentration than that used in the low pressure absorber. The now purified recycle gas stream is removed in line 8, and a rich amine stream is removed in line 10.

The two rich amine streams are then admixed by passage into line 11. An additional rich amine stream carried from a third absorber by line 30 is admixed with the contents of line 11 to form a combined rich amine stream which is passed into a flash drum 12 via line 31. The conditions maintained within the flash drum cause the vaporization of highly volatile materials such as hydrogen, methane and ethane contained in the combined rich amine stream. A resultant vapor stream is removed from the flash drum through line 13. The combined rich amine stream is removed from the flash drum in line 14 and heat exchanged against a sidecut from a stripper in heat exchanger 24. It is then further heated in heat exchanger 21 by indirect heat exchange against the bottoms stream of the amine regenerator.

The thus-heated rich amine stream is passed into an upper portion of a stripping column 16 which is used to regenerate the amine stream. Bottoms liquid is withdrawn from the stripping column through line 17 and partially vaporized in a reboiler 18 by indirect contact with high pressure steam from line 19. The resultant high temperatures and the upward vapor flow cause the removal of the hydrogen sulfide from the rich amine solution contained in the stripper. A hydrogen sulfide-rich overhead vapor stream is therefore removed from the stripping column in line 15. The customary overhead condenser receiver and reflux line are not shown. A first lean amine stream is removed from the stripping column as a liquid sidecut in line 9. It is cooled in heat exchanger 24 and in cooler 25. The first lean amine stream in line 9 is pressurized by a pump not shown and passed into the top of the high pressure absorber 7. A bottoms liquid stream is removed from the stripping column in line 20. The liquid removed as the bottoms stream contains a lower concentration of dissolved acid gas, that is $H_2S$, than the liquid sidecut. Also, the mole ratio of MEA to $H_2S$ is greater in the bottoms stream than in the sidecut stream. A small portion of this material may be diverted through line 22 to an amine reclaimer in a manner which is customary and known to those skilled in the art. The majority of the bottoms stream of the stripping column is passed into line 28 by way of the heat exchanger 21. The temperature of the bottoms stream is further reduced in cooler 23. This second lean amine stream is then divided into two portions. A first portion is passed to the third absorber through line 29, and a second portion is passed through line 4 as the lean amine stream utilized in the low pressure absorption zone 2.

DETAILED DESCRIPTION

The use of a selective absorbent solution to remove various preselected chemical compounds from gas streams is a widely practiced commercial process. The preselected chemical compound is often a sulfur compound, such as hydrogen sulfide, carbonyl sulfide or sulfur dioxide. Other compounds which may be removed from gas streams by absorption include ammonia, carbon monoxide, carbon dioxide, acetylene and various halogen-containing compounds, such as boron trifluoride, hydrogen chloride and hydrogen fluoride. Absorption with a lean hydrocarbonaceous oil is also used to remove light hydrocarbons having from one to four carbon atoms per molecule, such as propane, ethane and butane, from vapor streams in refinery operations. The subject invention has utility in the practice of these commercial absorption operations when they are performed on both a high pressure and a low pressure vapor stream.

It is an objective of this invention to provide a process for the simultaneous removal by absorption of a preselected chemical compound from a high pressure fluid stream and a low pressure fluid stream. It is another objective of this invention to provide a process for the removal of $H_2S$ from two or more petroleum refinery vapor streams which are at widely different pressures.

The generic absorption process is a continuous operation involving two basic steps. In the absorption step the fluid feed stream to be treated or purified is contacted, preferably but not necessarily, in a countercurrent manner by a stream of lean liquid absorbent solution which is selective for the chemical compound which it is desired to remove from the fluid stream. This step will be conducted at absorption-promoting conditions. With the preferred regenerable absorbents these conditions are characterized by a lower temperature and normally a higher pressure than the regeneration conditions for these same absorbents. The absorption of the preselected chemical compound into the liquid results in the formation of what is referred to in the art as a rich absorbent stream.

In the second step of the generic process the chemical compound is liberated from rich absorbent to produce lean absorbent which is then returned to the absorption zones. This second or regeneration operation is preferably conducted in a stripping column. The rich absorbent stream is fed to the top of the stripping column and countercurrently contacted with rising vapors. These vapors may be formed solely by the vaporization of the absorbent, but they are often augmented by the use of stream or some other added vapor.

Amine solutions are the preferred absorbents for removing $H_2S$ from fluid streams. This may, however, be accomplished with other absorbents including a mixture of sulfolane (tetrahydrothiopene dioxide), di-isopropanolamine (DIPA) and water as used in the Sulfinol process. Aqueous solutions of potassium carbonate may also be utilized. The amine solutions utilize water as the solvent and may be used to remove acid gases including $H_2S$ and $CO_2$. Monoethanolamine is one of the most commonly used reagents and is well suited for gases rich in heavier hydrocarbons. Diethanolamine frequently is used when the vapor stream contains carbonyl sulfide which reacts irreversibly with MEA. Diglycolamine (DGA) at concentrations ranging from about 50 to 70 wt.% can be used to sweeten vapor streams containing carbonyl sulfide and/or carbon disulfide. DGA is sometimes preferred since it can be used in colder climates than the other amines.

The use of amine solutions is based on the fact that aliphatic alkanolamines will react with the acid gases at what may be referred to as slightly above atmospheric temperatures, but the acid gases are released at yet higher temperatures. Assuming a pressure of about 0 to 20 psig. the absorption of $H_2S$ by an amine solution will occur at about 100° F. or lower. $CO_2$ will be absorbed into this same solution at about 120° F. or lower. The amine solution is regenerated by heating to a temperature sufficient to reverse this chemical reaction and to cause the release of the acid gases. A temperature of about 240° F. will commonly be sufficient to release $H_2S$ from the amine solution. A higher temperature of about 300° F. is normally effective for $CO_2$.

The choice of which amine to use is guided by the factors set out above, corrosion rates, operating experience, the cost of the amine and the effect of amine choice on the utilities cost of operating the process. The concentration of the amine is the absorbent solution is subject to considerable variation. MEA may be used at concentrations ranging from about 10 to about 30 wt.%, but concentrations of from 15-20% are more typical. The corrosiveness of the amine generally increases with both the concentration of the amine and of $H_2S$ in the solution. It is conventional to limit the concentration of $H_2S$ in the rich solution to less than about 0.35 to 0.4 moles of $H_2S$ per mole of MEA. Those skilled in the art are conversant in the solutions, conditions, equipment and operational procedures which are needed to practice the absorption of acid gases with amine solutions.

The previously cited article from *The Oil and Gas Journal* makes clear the fact that those skilled in the art are knowledgeable in the regeneration of absorbent solutions including amine solutions. It also demonstrates that the prior art includes the removal of a liquid sidecut from the absorbent regeneration column. This is done to allow the contacting of the remaining absorbent liquid, which descends the column, with a higher number of pounds of steam on a per pound basis than is performed in the top of the regenerator column. This higher stripping rate is beneficial to the production of a "leaner" absorbent stream removed as the bottoms stream of the regenerator. That is, the remaining portion of the absorbent is contacted at a high stripping rate. In this manner an adequate quantity of the leaner absorbent can be produced at a lower total steam consumption than if all of the absorbent was regenerated to the same extent. The result is a more energy efficient operation.

The prior art has utilized this regeneration method to produce two lean absorbent streams which are then both utilized in the same absorption zone. The leaner absorbent stream is utilized to treat a vapor stream which has already been contacted with the absorbent removed as the sidecut. These two contacting steps are performed at essentially the same pressure. This sequential contacting of a single vapor stream with the two absorbents is a more economical process than the simpler use of just the regenerator bottoms as the absorbent.

It has now been found that two fluid streams having different pressures may both be treated for the removal of a preselected chemical compound using a single regenerator having a liquid sidecut. More specifically, it has been found that the regenerator sidecut stream may be the only absorbent required to adequately treat a high pressure gas stream while the bottoms of the regenerator is being used to treat a different, low pressure vapor stream. In the preferred embodiment the high pressure vapor stream is a hydrogen-rich recycle gas stream used in a petroleum desulfurization process such as described in U.S. Pat. Nos. 3,725,252 and 3,847,799. These processes can tolerate the presence of some $H_2S$ in the recycle gas stream. The degree of $H_2S$ removal from this stream therefore need not be complete, and it is very suited for use in the subject process. The high pressure gas stream could also be a stream of raw natural gas or a recycle stream of a gasification or liquefaction process. The low pressure vapor stream treated in the subject process is preferably a stream which requires a higher degree of $H_2S$ removal. It is therefore more likely to be a product stream or a stream which should be substantially sulfur-free. Examples of this are the off-gases of various product strippers which are to be charged to gas concentration units for the production of relatively pure light hydrocarbon streams. The off-gases of stripping columns to which the liquid effluents of desulfurization units are charged are suitable low pressure vapor streams for the preferred embodiment of the subject process. Also, a richer lean amine stream can treat a high pressure gas stream to the same degree as a less rich lean amine stream can treat a low pressure stream.

The process requires two absorption zones which are maintained at absorption-promoting conditions. These conditions will vary depending on such factors as the specific absorbent which is chosen, the chemical compound to be removed, and the temperature and pressure desired in operations both upstream and downstream of the absorption zone. The temperature utilized in the absorption zones is preferably between about 60° F. to 155° F. Temperatures above or below this range may, however, also be utilized if desired. Since the absorption process is often exothermic, the temperature of the absorbent may be increased in the absorption zones. Unless otherwise specified the temperatures given herein refer to the rich absorbent solution which is removed from the respective zone. The absorption-promoting conditions also include a superatmospheric pressure which differs by about 14 atmospheres or more between the two absorption zones. The low pressure zone is preferably maintained at a pressure below 14 atmospheres absolute. The high pressure absorption zone should be maintained at a pressure above 28 atmospheres, and more preferably above 42 atmospheres absolute.

The regeneration conditions required for performance of the process are also subject to variation. The factors on which they depend also include a consideration of the required concentration of the absorbent solutions and the difference in the utilities costs of operation at various possible conditions. The regeneration zone is preferably maintained at a superatmospheric pressure below 7.5 atmospheres absolute. However, higher pressures may be utilized. The temperature within the regeneration zone will vary from point to point and will be highest at the bottom of the zone. The entire regeneration zone is preferably maintained at a temperature above 200° F. The sidecut and bottoms streams are both preferably removed at a temperature above about 230° F. when amine solutions are being regenerated, but the temperature of the bottoms liquid is preferably kept below about 300° F.

It is important to note that a basic part of the subject invention is the individualized usage of regenerator sidecut and bottoms streams having different potentials for removing the preselected chemical compound. These potentials are shown or determinable in several ways. One of these is the concentration of the preselected chemical compound. Another is the concentration of the absorbent compound in the solution. The relation of these two characterization factors in the process of the invention is illustrated by the preferred embodiment. The concentration of $H_2S$ is lower in the bottoms stream than in the sidecut stream, and the concentration of the amine is higher in the bottoms stream. More important, however, is the mole ratio of MEA of $H_2S$, that is the mole ratio of the absorbent compound to the preselected compound. This is because this governs the equilibrium vapor pressure of the preselected compound over the absorbent solution at a specified pressure. The stripping in the lower section of the regenerator produces a bottoms stream having a higher mole ratio than the sidecut stream. This is also illustrated by the preferred embodiment as shown in the following example.

The apparatus comprising the absorption zones may be of any type which affords intimate contact of the absorbent solution with the fluid stream to be treated. It could be one or more agitated mixing zones used in series or a rotating disk contactor. Preferably, these zones allow the countercurrent contacting of the absorbent solution and the feed stream and comprise vertically oriented trayed contacting columns. Packed columns may of course be substituted if it is desirable to do so. The preferred columns may contain any type of tray including the well known sieve, valve and bubble cap varieties. The type of tray will be chosen on such factors as whether the feed stream is a liquid phase or vapor phase stream. The apparatus used for the regeneration zone is a vertically oriented trayed column. It also may have any of the various types of trays, but valve trays are preferred.

When treating hydrocarbon feed streams in the absorbers, a small amount of the hydrocarbons becomes dissolved in the absorbent solution. This is especially true with the lighter hydrocarbons. The rich absorbent solutions are therefore often passed into a flash zone wherein most of the hydrocarbons are removed. This zone is operated at a pressure below that in the low pressure absorption zone. This pressure is preferably low enough that hydrocarbons having fewer than three carbon atoms per molecule are vaporized. It is customarily a horizontally aligned cylindrical vessel suitable to provide laminar liquid flow. Any vaporous material released in this zone is vented by a pressure control system. A liquid hydrocarbon phase may also be formed and separated by decantation. The temperature of the flash zone is normally that which is produced by admixing the rich absorbent streams from the two absorption zones. It may not be either desired or necessary to utilize this flash zone, and it is therefore not required in a broad embodiment of the invention.

In accordance with this description the preferred embodiment of the invention may be characterized as a process for removing $H_2S$ from a first high pressure vapor stream and from a first low pressure vapor stream which comprises the steps of countercurrently contacting the first high pressure vapor stream, which comprises hydrogen, with a first lean absorbent stream comprising an aqueous amine solution in a first absorption zone maintained at absorption-promoting conditions including a pressure above 42 atmospheres, and thereby effecting the formation of a first rich absorbent stream and a second high pressure vapor stream which has a lower $H_2S$ concentration than the first high pressure vapor stream; countercurrently contacting the first low pressure vapor stream, which comprises propane, with a second lean absorbent stream comprising an aqueous amine solution in a second absorption zone maintained at absorption-promoting conditions including a pressure below 14 atmospheres, and thereby effecting the formation of a second rich absorbent stream and a second low pressure vapor stream which has a lower $H_2S$ concentration than the first low pressure vapor stream; passing the first rich absorbent stream and the second rich absorbent stream into a flash zone maintained at flashing conditions effective to cause the vaporization of hydrocarbons having fewer than three carbon atoms per molecule; withdrawing a third rich absorbent stream from the flash zone and passing the third rich absorbent stream into an upper point of an absorbent regeneration zone maintained at absorbent regeneration conditions which include the countercurrent contacting of liquid phase absorbent with rising vapors; withdrawing a liquid sidecut stream which has a lower $H_2S$ concentration than the third rich absorbent stream from the absorbent regeneration zone, and passing at least a portion of the liquid sidecut stream into the first absorption zone as the first lean absorbent stream; and, withdrawing a bottoms liquid stream which has a lower $H_2S$ concentration than the liquid sidecut stream from the absorbent regeneration zone, and passing at least a portion of the bottoms liquid stream into the second absorption zone as the second lean absorbent stream.

The invention may be further illustrated by this example of the preferred embodiment. It is presented as the invention would be used to remove $H_2S$ from various hydrocarbon and vapor streams produced in a petroleum refinery. Reference will be made to the Drawing to describe the general operation of the process. A low pressure feed stream comprising the off-gas streams removed from two stripping columns enters the process in line 1. The feeds to these stripping columns are effluent streams of the desulfurization processes treating an atmospheric gas oil and a vacuum gas oil. This low pressure stream contains about 7.0 mph (moles per hour) of water, 289 mph $H_2S$, 180 mph hydrogen, 215 mph methane, 230 mph ethane, 170 mph of $C_3$ hydrocarbons, 96 mph of $C_4$ hydrocarbons, 32.3 mph of $C_5$ and about 9 mph of various $C_6+$ hydrocarbons. It enters the bottom of a 20-deck valve tray absorber 2 at a pressure of 135 psig. and a temperature of about 100° F. The lean amine stream fed to this column via line 4 contains about 6220 mph of water, 611 mph of MEA and 16.5 mph of $H_2S$. This stream enters the top of the low pressure absorber at a temperature of about 100° F. and a pressure of 160 psig. The rich amine stream in line 5 contains about 306 mph of $H_2S$ and minor amounts (less than 0.9 mph total) of the various $C_1$-$C_5$ hydrocarbons. It has a temperature of about 153° F. The treated product gas stream in line 3 contains about 8.8 mph of water, about 0.02 mph of $H_2S$ and essentially all of the hydrogen and hydrocarbons in the feed stream.

The feed gas stream in line 6 is a recycle gas stream removed from a vapor-liquid separator in a vacuum gas oil desulfurization process. $H_2S$ is to be removed from this stream prior to its return to the reactor section. The feed gas stream contains about 20.5 mph of $H_2O$; 542 mph of $H_2S$; 13,500 mph of hydrogen; 3,390 mph of methane; 1,070 mph of $C_2$ hydrocarbons; 360 mph of $C_3$ hydrocarbons and much smaller amounts of many various heavier hydrocarbons. This stream enters the bottom of a 10-deck valve tray absorber 7 having a 5-tray water wash top section. It enters the absorber at a pressure of about 895 psig. and a temperature of 100° F. The lean amine stream in line 9 contains about 17.5 wt.% MEA. It enters the top of the absorber at a temperature of about 100° F. and a total flow rate of 388,000 lb/hr. This lean stream contains about 50 mph of $H_2S$. The rich amine stream removed in line 10 contains about 554 mph of $H_2S$. The content of the treated gas stream is essentially the same as that of the feed stream except for the $H_2S$ which has been removed. This stream has a temperature of about 110° F. and a pressure of 895 psig.

The two rich amine solutions are combined and then admixed with two additional rich amine streams. This is in keeping with the customary practice of having one regenerator provide the lean amine solution for several absorbers. The resultant total rich amine stream has a flow rate of about 587,000 lb/hr and enters the flash drum at a pressure of 80 psig. and a temperature of approximately 145° F. The off-gas stream from the flash drum contains about 0.6 mph of water, 8.5 mph of hydrogen, 2.5 mph of methane, 2.2 mph of $C_2$ hydrocarbons and less than 1 mph of other compounds. It is scrubbed with lean MEA fed to the top of the flash drum to prevent the escape of $H_2S$. The rich amine stream is then removed from the flash drum and contains about 24,900 mph water, 1,810 mph of MEA and 875 mph of $H_2S$. It is heated to 175° F. in heat exchanger 24 and to 190° F. in heat exchanger 21.

The total rich amine stream enters stripper (regenerator) 16 at a pressure of 14 psig. This stripper is operated in the customary manner utilizing an overhead condenser and receiver. The net gas from the receiver is removed at a temperature of about 100° F. It contains about 32 mph of water; 807 mph of $H_2S$; 1.3 mph of hydrogen and very small amounts of $C_1$-$C_4$ hydrocarbons. The stripper contains 25 valve type trays and is fed at the third tray from the top. The liquid sidecut is removed from a trap-out located above the twenty-first tray. It has a temperature of about 255° F. and a flow rate of about 388,000 lb/hr. The sidecut stream contains about 17.5 wt.% MEA and 0.26 mol.% $H_2S$. The mole ratio of MEA to $H_2S$ in the sidecut stream is about 22:1. After being cooled, all of this stream is passed into the high pressure absorber 7 as the lean amine stream. The liquid in the bottom of the stripper is maintained at a temperature of about 260° F. by an external reboiler. In addition, about 35 mph of 60 psig. steam is fed into the bottom of the column through the reboiler. The bottoms stream of the stripper is removed at 17 psig. and has a flow rate of about 173,000 lb/hr. It is cooled to about 208° F. in heat exchanger 21 and then to about 100° F. in cooler 23. The bottoms stream contains about 25 wt.% MEA and is used as the lean amine solution fed to low pressure absorbers through lines 4 and 29. It contains about 0.24 mol.% $H_2S$ and about 25 wt.% MEA. The mole ratio of MEA to $H_2S$ is about 37:1.

I claim as my invention:

1. A process for removing a preselected chemical compound from a first high pressure fluid stream and from a first low pressure fluid stream which comprises the steps of:
    (a) contacting the first high pressure fluid stream with a first lean absorbent stream in a first absorption zone maintained at absorption-promoting conditions including a pressure above 28 atmospheres, and thereby effecting the formation of a first rich absorbent stream and a second high pressure fluid stream which has a lower concentration of the preselected chemical compound than the first high pressure fluid stream;
    (b) contacting the first low pressure fluid stream with a second lean absorbent stream in a second absorption zone maintained at absorption-promoting conditions including a pressure below 14 atmospheres, and thereby effecting the formation of a second rich absorbent stream and a second low pressure fluid stream which has a lower concentration of the preselected chemical compound than the first low pressure fluid stream;
    (c) passing the first rich absorbent stream and the second rich absorbent stream into an upper point of an absorbent regeneration zone maintained at absorbent regeneration conditions which include the countercurrent contacting of liquid phase absorbent with rising vapors;
    (d) withdrawing a liquid sidecut stream which has a lower concentration of the preselected chemical compound than the first rich absorbent stream from the absorbent regeneration zone, and passing at least a portion of the liquid sidecut stream into the first absorption zone as the sole absorbent stream in said first absorption zone; and,
    (e) withdrawing a bottoms liquid stream which has a lower concentration of the preselected chemical compound than the liquid sidecut stream from the absorbent regeneration zone, and passing at least a portion of the bottoms liquid stream into the second absorption zone as the sole absorbent stream in said second absorption zone.

2. The process of claim 1 further characterized in that both the first high pressure fluid stream and the first low pressure fluid stream are vapor phase streams and in that the preselected chemical compound is chosen from the group consisting of hydrogen sulfide, carbonyl sulfide, sulfur dioxide, ammonia, carbon dioxide, carbon monoxide, hydrogen chloride, hydrogen fluoride, ethane, acetylene and butane.

3. The process of claim 1 further characterized in that the preselected chemical compound is hydrogen sulfide, and in that the first high pressure fluid stream comprises vapor-phase hydrogen and the first low pressure fluid stream comprises vapor-phase propane.

4. A process for removing $H_2S$ from a first high pressure fluid stream and from a first low pressure fluid stream which comprises the steps of:
    (a) countercurrently contacting the first high pressure fluid stream with a first lean absorbent stream in a first absorption zone maintained at absorption-promoting conditions including a pressure above 28 atmospheres, and thereby effecting the formation of a first rich absorbent stream and a second high pressure fluid stream which has a lower $H_2S$ concentration than the first high pressure fluid stream;
    (b) countercurrently contacting the first low pressure fluid stream with a second lean absorbent stream in a second absorption zone maintained at absorption-promoting conditions including a pressure below 14 atmospheres, and thereby effecting the formation of a second rich absorbent stream and a second low pressure fluid stream which has a lower $H_2S$ concentration than the first low pressure fluid stream;
    (c) passing the first rich absorbent stream and the second rich absorbent stream into a flash zone maintained at flashing conditions effective to cause the vaporization of hydrocarbons having fewer than three carbon atoms per molecule;
    (d) withdrawing a third rich absorbent stream from the flash zone and passing the third rich absorbent stream into an upper point of an absorbent regeneration zone maintained at absorbent regeneration conditions which include the countercurrent contacting of liquid phase adsorbent with rising vapors;
    (e) withdrawing a liquid sidecut stream which has a lower $H_2S$ concentration than the third rich absorbent stream from the absorbent regeneration zone, and passing at least a portion of the liquid sidecut stream into the first absorption zone as the sole absorbent stream in said first absorption zone; and,
    (f) withdrawing a bottoms liquid stream which has a lower $H_2S$ concentration than the liquid sidecut stream from the absorbent regeneration zone, and passing at least a portion of the bottoms liquid stream into the second absorption zone as the sole absorbent stream in said second absorption zone.

5. The process of claim 4 further characterized in that both the first high pressure fluid stream and the first low pressure fluid stream are vapor phase streams.

6. The process of claim 4 further characterized in that the first high pressure fluid stream is a vapor phase stream and the first low pressure fluid stream is a liquid phase stream.

7. The process of claim 5 further characterized in that the first, second and third rich absorbent streams comprise an aqueous amine solution.

8. The process of claim 7 further characterized in that the first absorption zone is maintained at a pressure in excess of 42 atmospheres.

9. The process of claim 8 wherein the first high pressure fluid stream comprises hydrogen and the first low pressure fluid stream comprises propane.

* * * * *